US008347000B2

(12) United States Patent
Kim et al.

(10) Patent No.: US 8,347,000 B2
(45) Date of Patent: Jan. 1, 2013

(54) SYSTEM AND METHOD DETECTING CABLE PLUG STATUS IN DISPLAY DEVICE

(75) Inventors: Byung-koan Kim, Suwon-si (KR); Woo-chae Jeon, Yongin-si (KR); Jong-hoon Hong, Yongin-si (KR); Yeong-cheol Rhee, Suwon-si (KR); Ock-chul Shin, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/118,681

(22) Filed: May 31, 2011

(65) Prior Publication Data

US 2011/0302340 A1 Dec. 8, 2011

(30) Foreign Application Priority Data

Jun. 4, 2010 (KR) ........................ 10-2010-0053034

(51) Int. Cl.
*G06F 3/00* (2006.01)
*G06F 13/38* (2006.01)
*G06F 1/12* (2006.01)

(52) U.S. Cl. .............. 710/58; 710/61; 710/62; 713/500; 713/600

(58) Field of Classification Search ........................ None
See application file for complete search history.

(56) References Cited

U.S. PATENT DOCUMENTS

| | | | | | |
|---|---|---|---|---|---|
| 5,561,764 | A * | 10/1996 | Ninomiya | ........................ | 714/37 |
| 5,822,571 | A * | 10/1998 | Goodrum et al. | ............. | 713/400 |
| 6,243,780 | B1 * | 6/2001 | Jun | .............................. | 710/316 |
| 6,487,719 | B1 * | 11/2002 | Itoh et al. | ........................ | 725/17 |
| 6,816,993 | B1 * | 11/2004 | Furuyama | ..................... | 714/747 |
| 6,886,049 | B2 * | 4/2005 | Wong | ................................ | 710/8 |
| 7,401,166 | B2 * | 7/2008 | Herfet et al. | ..................... | 710/17 |
| 8,174,380 | B2 * | 5/2012 | Travis et al. | .................. | 340/538 |
| 2002/0075255 | A1 * | 6/2002 | Baek et al. | ..................... | 345/212 |
| 2008/0018584 | A1 * | 1/2008 | Park et al. | ........................ | 345/99 |
| 2009/0238288 | A1 * | 9/2009 | Kodama et al. | ............... | 375/259 |
| 2010/0073560 | A1 * | 3/2010 | Kitano et al. | ................. | 348/554 |
| 2010/0302220 | A1 * | 12/2010 | Baek et al. | .................... | 345/204 |

FOREIGN PATENT DOCUMENTS

| | | |
|---|---|---|
| KR | 1020070080170 A | 8/2007 |
| KR | 1020080039717 A | 5/2008 |
| KR | 1020080050313 A | 6/2008 |

* cited by examiner

*Primary Examiner* — Henry Tsai
*Assistant Examiner* — Michael Sun
(74) *Attorney, Agent, or Firm* — Volentine & Whitt, PLLC

(57) ABSTRACT

A timing controller provides a cable plug status detection function by receiving a reference lock signal from a graphics system connected via a constituent cable and comparing the reference lock signal to one or more reference time periods to determine the cable plug status.

16 Claims, 10 Drawing Sheets

SYSTEM AND METHOD DETECTING CABLE PLUG STATUS IN DISPLAY DEVICE

CROSS-REFERENCE TO RELATED APPLICATIONS

This application claims the benefit of Korean Patent Application No. 10-2010-0053034 filed on Jun. 4, 2010, the subject matter of which is hereby incorporated by reference.

BACKGROUND OF THE INVENTION

The inventive concept relates to systems and methods providing enhanced connection reliability and certainty related to a mechanical plug connecting a display device and a graphics system. More particularly, the inventive concept provides systems and methods capable of stably driving a display system after checking plug status using an internal circuit instead of a hot-plug signal between a display device and a graphics system.

As portable information devices are more widely adopted, flat panel display (FPD) devices increasingly replace cathode ray tube (CRT) devices as display devices. Among other types of FPD devices, thin film transistor-liquid crystal display (TFT-LCD) devices that display an image by using optical anisotropy of liquid crystals are widely used. LCD devices have excellent resolution, color display, and image quality and are thus widely used in desktop computers, notebook computers, large-size televisions (TVs) and similar devices that once used CRT devices.

SUMMARY OF THE INVENTION

Certain embodiments of the inventive concept provide a system and/or method that prevents malfunction of a timing controller due to hot plugging, where the malfunction occurs due to noise generated by hot plugging when the timing controller and a graphics system are connected to each other, thereby causing a variation in values of registers in the timing controller due to logic toggling and/or power/ground bounce.

According to an aspect of the inventive concept, there is provided a method of detecting a cable plug status in a display device including a graphics system and timing controller, the method comprising; receiving a reference lock signal in the timing controller from a graphics system via the cable connecting the graphics system with the timing controller, and comparing the reference lock signal to least one reference time period to determine the cable plug status.

According to another aspect of the inventive concept, there is provided a timing controller providing a cable plug status detection function. The timing controller comprises a plug detection unit that receives a reference lock signal from a graphics system connected via a cable and compares the reference lock signal to least one reference time period to determine the cable plug status.

BRIEF DESCRIPTION OF THE DRAWINGS

Embodiments of the inventive concept will be more clearly understood from the following detailed description taken in conjunction with the accompanying drawings in which.

DETAILED DESCRIPTION

Reference will now be made to certain embodiments of the inventive illustrated in the accompanying drawings. However, the scope of the inventive concept is not limited to only the illustrated embodiments. The embodiments described herein teach those skilled in the art the making and use of the inventive concept. Throughout the written description and drawings, like reference numbers and labels are used to denote like or similar elements.

Figure 1:
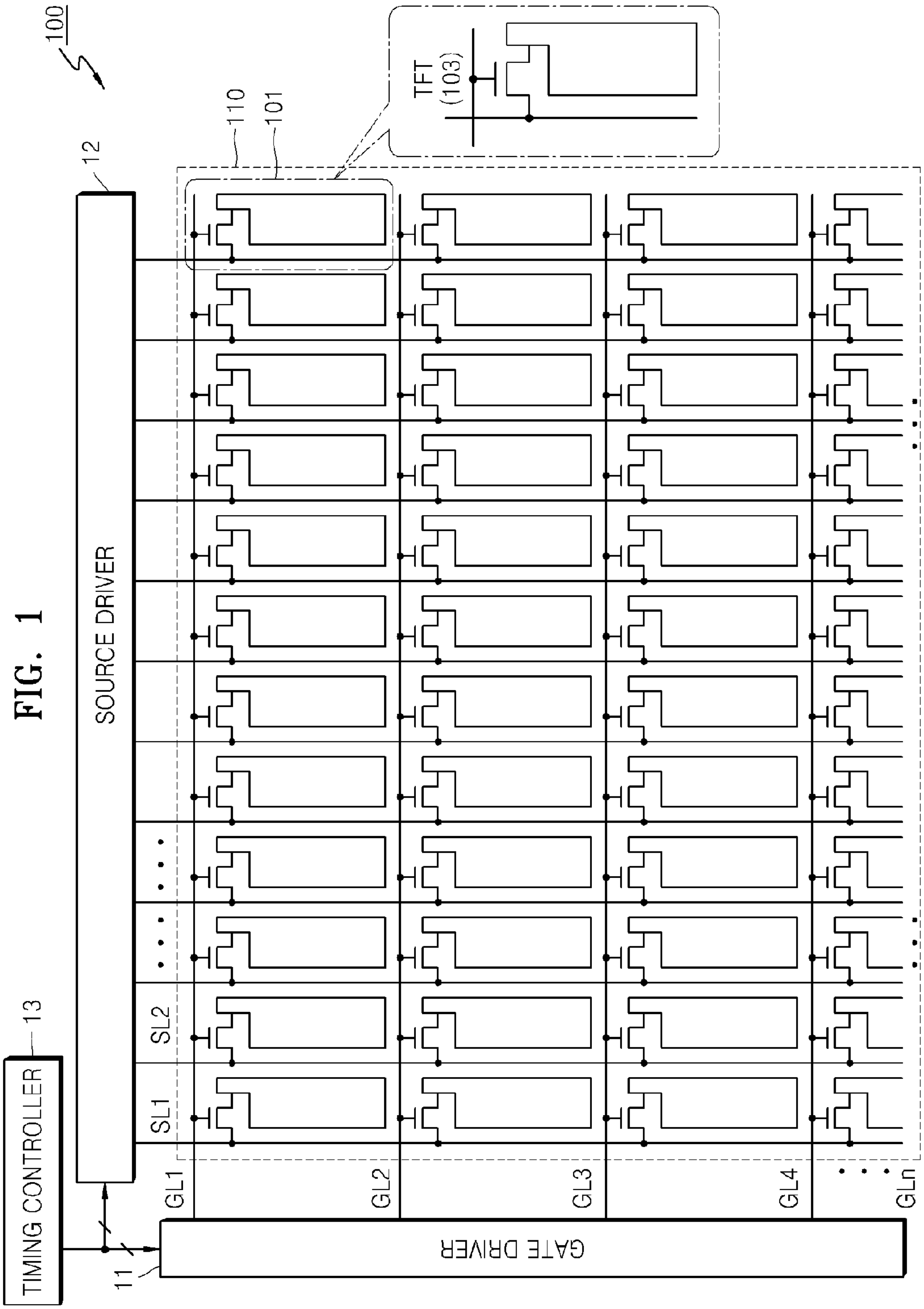
FIG. 1 illustrates a driving system of a liquid crystal display (LCD) device.

FIG. 1 illustrates a driving system of a liquid crystal display (LCD) device 100.

Referring to FIG. 1, the LCD device 100 generally comprises a liquid crystal panel 110 in which a plurality of liquid crystal cells 101 are arranged in a matrix. The matrix formed by the plurality of liquid crystal cells 101 is defined by a plurality of gate lines GL1 through GLn and a plurality of source lines SL1 through SLn. The LCD device 100 further includes a gate driver 11 that applies gate scan signals to the gate lines GL1 through GLn of the liquid crystal panel 110, a source driver 12 that applies pixel signals to the source lines SL1 through SLn of the liquid crystal panel 110, and a timing controller 13 that controls the gate driver 11 and the source driver 12. The timing controller 13 may be constituted as an additional chip. FIG. 1 illustrates only four of the gate lines GL1 through GLn. However, those skilled in the art will understand that a much larger number of gate lines will be necessary in implementing a display system having a useful screen size. Nonetheless, the limited number of illustrated elements in FIG. 1 is sufficient to understand the general operative nature of the LCD device 100.

Individual liquid crystal cells 101 are arranged in the liquid crystal panel 110 in accordance with a corresponding matrix of thin film transistors (TFTs) 103 connected to the gate lines GL1 through GLn and the source lines SL1 through SLn and electrically operated or “driven” in accordance with signals communicated by the gate lines GL1 through GLn and the source lines SL1 through SLn.

Generally, the TFTs 103 are turned ON when scan signals are supplied from the gate lines GL1 through GLn, (i.e., when a gate-ON voltage is applied as a gate voltage and corresponding pixel signals are provided from the liquid crystal cells 101 via the source lines SLn to through SLn). On the other hand, the TFTs 103 of the liquid crystal cells 101 are turned OFF when respective gate-OFF voltages are applied to the gate lines GL1 through GLn, and the pixel signals charged in the liquid crystal cells 101 are stored.

Generally, the liquid crystal cells 101 include pixel electrodes connected to the TFTs 103 to receive the pixel signals, and common electrodes facing the pixel electrodes such that a liquid crystal capacity capacitor is effectively formed in the liquid crystal cells 101. Additionally, a storage capacitor is formed in the liquid crystal cells 101 in order to stably maintain the pixel signals between pixel signal charging cycles. In the LCD device 100 having the above-described structure, the arrangement status of liquid crystal molecules having dielectric anisotropy is changed according to the pixel signals input via the TFTs 103, and a gray scale may be realized by controlling light transmittance according to the arrangement status of the liquid crystal molecules.

Various gate control signals are input to the gate driver 11 from the timing controller 13. As the gate control signals are input to the gate driver 11, gate voltages are sequentially output to the gate lines GL1 through GLn, and each of the TFTs 103 connected to the gate lines GL1 through GLn is driven.

As source control signals are input to the source driver 12 from the timing controller 13, the pixel signals are output to the source lines SL1 through SLn. In this regard, the source driver 12 converts red (R), green (G), and blue (B) digital signals supplied from the timing controller 13 into analog pixel signals and supplies the analog pixel signals to the source lines SL1 through SLn.

In certain embodiments of the inventive concept, the timing controller 13 may be provided as a module of a display panel and may use low voltage differential signaling (LVDS) or similar interface signaling. The timing controller 13 receives video data and timing information through competent, and conventionally understood, interfaces, transmits the video data to the display panel, and generates signals used to control the source driver 12 or the gate driver 11, thereby controlling the images displayed by the display panel.

As will be recognized by those skilled in the art, LVDS is one type of cable transmission specification that addresses many contemporary signaling problems, such as electro magnetic interference (EMI) caused by high voltage/multiple line transmission and noise caused by low voltage transmission. The LVDS techniques generally use multiplexing and differential signal transmission to communicate large quantities of information data (e.g., image data and related control signaling and control data) at relatively high speeds. In one particular adaptation of LVDS, seven signals each having an amplitude 1/10 that of conventional transistor-transistor logic (TTL) are loaded into one pair line, thereby reducing the number of cable wires required. These signals are transmitted in pairs having an opposite phase to reduce EMI. Since LVDS uses differential signals, a direct current (DC) level has nothing to do with external noise and noise may be reduced accordingly.

Figure 2:
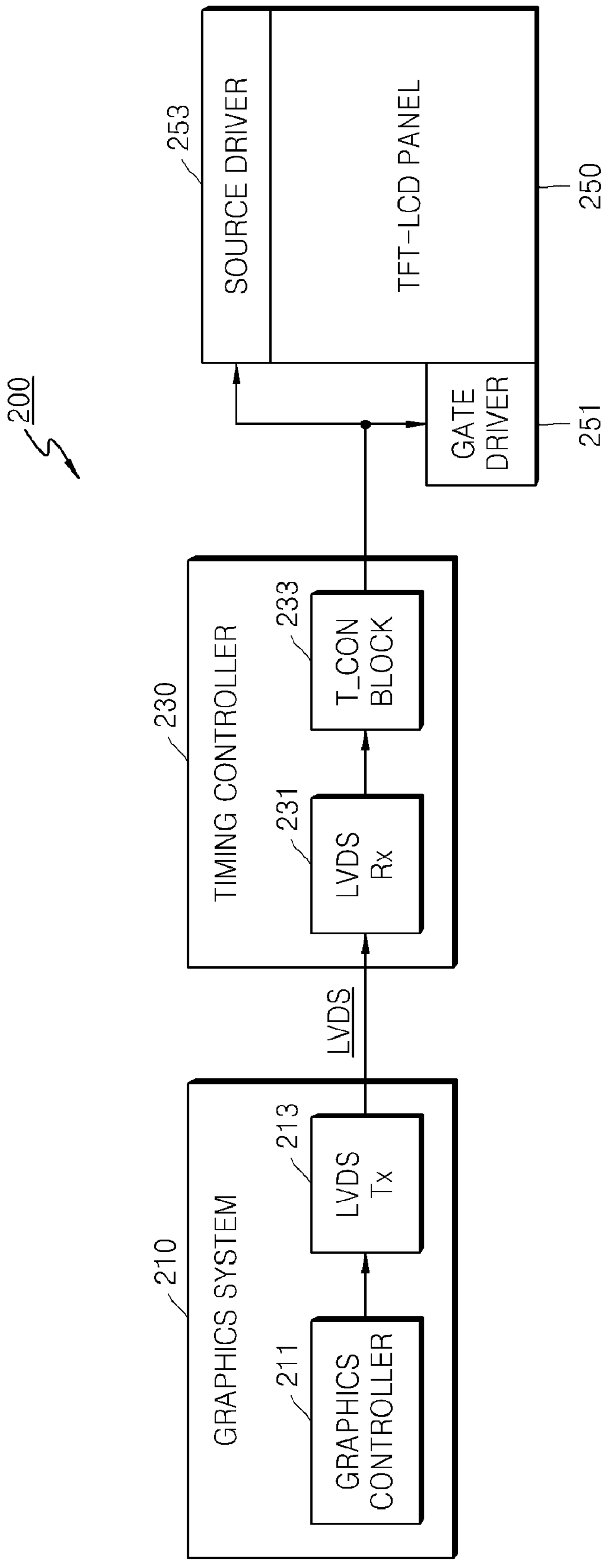
FIG. 2 illustrates a display system including a graphics system and a timing controller.

FIG. 2 illustrates a display system 200 comprising a graphics system 210, a timing controller 230, and a TFT-LCD panel 250. The graphics system 210 includes a graphics controller 211 and a LVDS transmitter 213 through which the graphics system 210 is connected to the timing controller 230. Those skilled in the art will recognize that various types of interfaces other than the LVDS transmitter 213 may be used in other embodiments of the inventive concept.

The timing controller 230 includes an LVDS receiver 231 as an interface that receives information from the graphics system 210. The timing controller 230 further includes a timing controller block 233 that generates signals controlling a gate driver 251 and a source driver 253 in accordance with the information received from the LVDS receiver 231. The control signals generated by the timing controller block 233 are transmitted to the gate driver 251 and the source driver 253 of the TFT-LCD panel 250 and are used to control liquid crystal cells of the TFT-LCD panel 250.

The timing controller 230 uses clock signals and control signals that are received from an input interface, such as LVDS, so as to drive the TFT-LCD panel 250 and generate data processing and control signals in the timing controller 230.

However, when a cable (i.e., any collection or arrangement of signal transmitting wires) is connected to the input interface, such as LVDS, a power supply source is first connected to the input interface and a data transmission cable is connected to the input interface, several problems may occur. When the power supply source is connected to the input interface, the timing controller 230 reads data from a memory, such as an external electrically erasable programmable read-only memory (EEPROM). Subsequently, when the cable is connected to the input interface to communicate information data, a "glitch" (i.e., a transient voltage or current effect that has the potential to destabilize stored data or defined circuit operation) may occur in relation to the LVDS. In certain circumstances, a resulting cable connection glitch may cause malfunction of the display system 200.

That is, when the glitch is applied to a semiconductor integrated circuit (IC or chip) within the timing controller 230, an unintended switching operation may occur within the circuitry implementing the timing controller 230. Such an unintended switching operation may cause an undesired change (or variation) in the data values stored in certain registers, buffers, flip-flops, memory cells, etc. of the timing controller 230. Also, due to internal ground bounce potentially caused by the cable connection, certain lookup table values in the timing controller 230 may be deleted or changed. Additionally, noise effects associated with cable connection or manipulation and the resulting data value changes to registers in the timing controller 230 may vary to the point that the display panel is stuck with an abnormal screen display that can not be reset or returned to a normal status. This phenomenon may be caused by the noise generated when hot plugging between the graphics system 210 and the timing controller 230 occurs, which causes rapid toggling in various types of logic circuits in the timing controller 230, and/or by power/ground bounce that results in an unintended variation in data values of registers in the timing controller 230.

Thus, an approach that prevents malfunction of the timing controller 230 due to the foregoing hot plugging effects upon an input interface is necessary. By detecting a hot-plug status for the timing controller 230 using a logic circuit without allocating additional hot plugging pins, power/ground bounce in the timing controller 230 may be suppressed.

Figure 3:
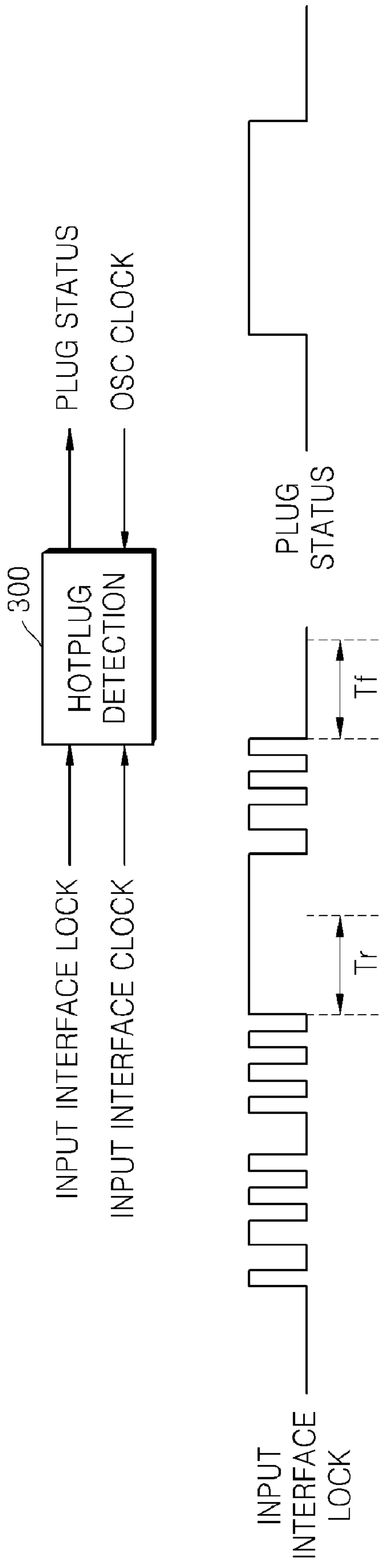
FIG. 3 conceptually illustrates hot-plug detection according to an embodiment of the inventive concept.

FIG. 3 conceptually illustrates an approach to hot-plug detection according to an embodiment of the inventive concept.

A hot-plug detection unit 300 receives an input interface lock signal and an input interface clock signal from the graphics system (210 of FIG. 2). Also, the hot-plug detection unit 300 receives an oscillator (OSO) clock signal as an input signal. The hot-plug detection unit 300 outputs a plug status signal by combining the input interface lock signal, the input interface clock signal, and the oscillator clock signal. In the illustrated embodiment of FIG. 3, the input interface lock signal is a variable pulse signal. The display system 200 determines a cable plug status (i.e., plugged or unplugged) in accordance with nature of the input interface lock signal (i.e., the presence or absence of pulse signals over a predetermined time period, and/or a logical state over a predetermined time period). For example, if the input interface lock signal remains at a fixed level (i.e., a logically “high” level as shown in FIG. 3) for the predetermined time period (Tr), the display system 200 determines a positive cable plug status (i.e., the cable is plugged in) and provides a cable plug status signal at a defined (e.g., high) level. Alternately, if the input interface lock signal remains at a logically “low” level over a predetermined period of time (Tf), the display system 200 determines a negative cable plug status (i.e., the cable is unplugged) and provides a low cable plug status signal. The time periods (Tr) and (Tf) noted above are examples of reference time periods to which the reference lock signal (or signals and count values derived from the reference lock signal) may be compared.

Figure 4:
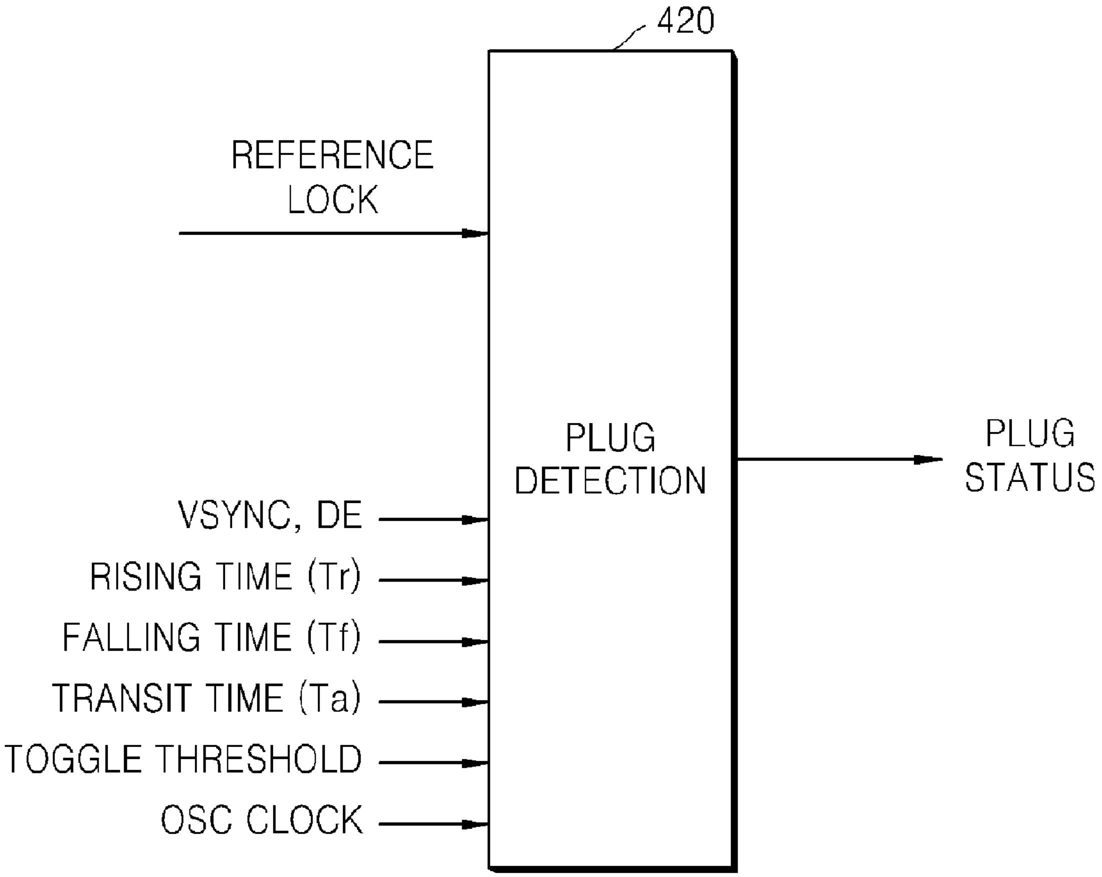
FIG. 4 is a block diagram illustrating a timing controller enabling a plug detection function according to an embodiment of the inventive concept.

FIG. 4 illustrates a block diagram of a timing controller providing a plug detection function according to an embodiment of the inventive concept.

A plug detection unit 420 receives a reference lock signal, a vertical synchronous signal (Vsync), a data enable signal (DE), a rising time (Tr), a falling time (Tf), and a transit time (Ta) from the graphics system 210. The duration of the rising time, falling time, and transit time (Ta) may be determined according to a number of systems parameters. The transit time (Ta) is another example of a reference time period to which the reference lock signal (or signals and count values derived from the reference lock signal) may be compared.

Also, the plug detection unit 420 receives a toggle threshold and an oscillator clock signal from the graphics system 210. The respective durations of the foregoing times may be or determined (or measured) by counting cycles of the oscillator clock signal using a counter.

One exemplary approach to determining cable plug status by comparing predetermined time values and the reference lock signal will be described with reference to the timing diagram of FIG. 5.

During periods in which the input reference lock signal repeatedly transitions for relatively short time periods into and out of either the positive or negative states (or repeatedly transitions between the positive and negative states), the cable is not securely plugged. However, when the reference lock signal is maintained in the positive state for a sufficiently long duration (i.e., a stable plugged-in period), it may be safely assumed that the cable is properly and securely plugged in. In this regard, the predetermined amount of time may be set as (Tr) and stored in a memory, such as an EEPROM.

Figure 5:
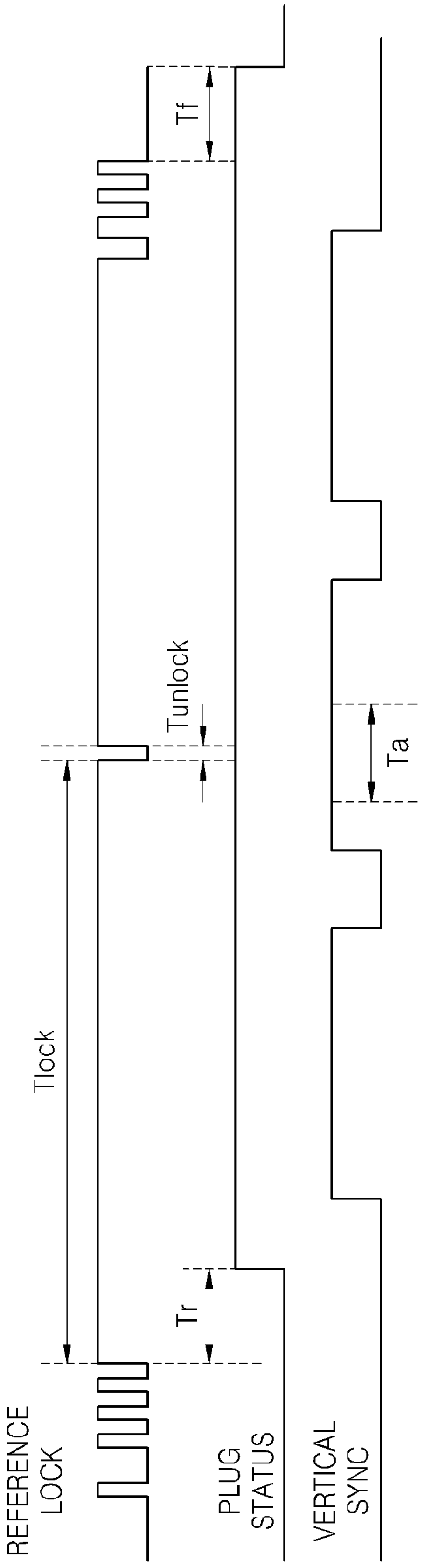
FIG. 5 is a timing diagram illustrating an approach to determining a cable plug status according to an embodiment of the inventive concept.

In the illustrated embodiment of FIG. 5, the plug detection unit 420 determines that the cable is securely plugged in when the reference lock signal is maintained at a high level (positive state) for the predetermined rising time Tr, and correspondingly indicates the positive cable plug status.

Alternately, when the cable is detached from the display system 200, the change in cable plug status must be recognized and properly indicated. For example, when the time at which the input reference lock signal is repeatedly maintained at a high level or a low level is short, the plug detection unit 420 determines that the cable has not been securely plugged yet. However, when the reference lock signal is maintained at a low level over the predetermined falling time (Tf), the plug detection unit 420 determines that the cable has been intentionally unplugged.

The rising and falling times (Tr and Tf) may be established as values sufficient to determine the cable plug status when the vertical synchronous signal Vsync is low, (i.e., when field scanning is not being performed). However, if the vertical synchronous signal Vsync is high, the cable plug status may be determined as follows. If the cable plug status is positive when the reference lock signal transitions from high to low during a particular Tunlock period (i.e., a time period shorter in duration than the transit time (Ta)), then it may be determined that the cable plug status has not changed to the cable unplugged status. However, if the reference lock signal transitions from high to low for a duration greater than the transit time (Ta), it may be determined that the cable plug status has been changed to the unplugged status.

In other embodiments of the invention concept, a cable plug status may be determined by counting a number of cycles (i.e., logical toggles from low to high or high to low) for the reference lock signal. When a counted number of cycles for the reference lock signal is large over a defined period, a defective cable plug status may be detected in contrast to the cable plugged status and the cable unplugged status.

So long as a counted number of reference lock signal cycles remains below a reference cycle (or toggle) threshold over a defined period, the cable plug status may be deemed unchanged. The cycle threshold may be preset and stored in a memory of the display system 200.

Exemplary criteria that may be used to determine cable plug status are listed in Table 1 below.

TABLE 1

| STATUS CHANGE | CRITERION |
|---|---|
| Unplugged to Unplugged | Tlock < Tr |
| Unplugged to Plugged | Tlock ≧ Tr |
| Plugged to Plugged | Vertical Sync = 1 && Tunlock < Ta |
| | Vertical Sync = 0 && Tunlock < Tf |
| | ToggleCnt < Toggle Threshold |
| Plugged to Unplugged | Vertical Sync = 1 && Tunlock ≧ Ta |
| | Vertical Sync = 0 && Tunlock ≧ Tf |
| | ToggleCnt ≧ Toggle Threshold |

Figure 6:
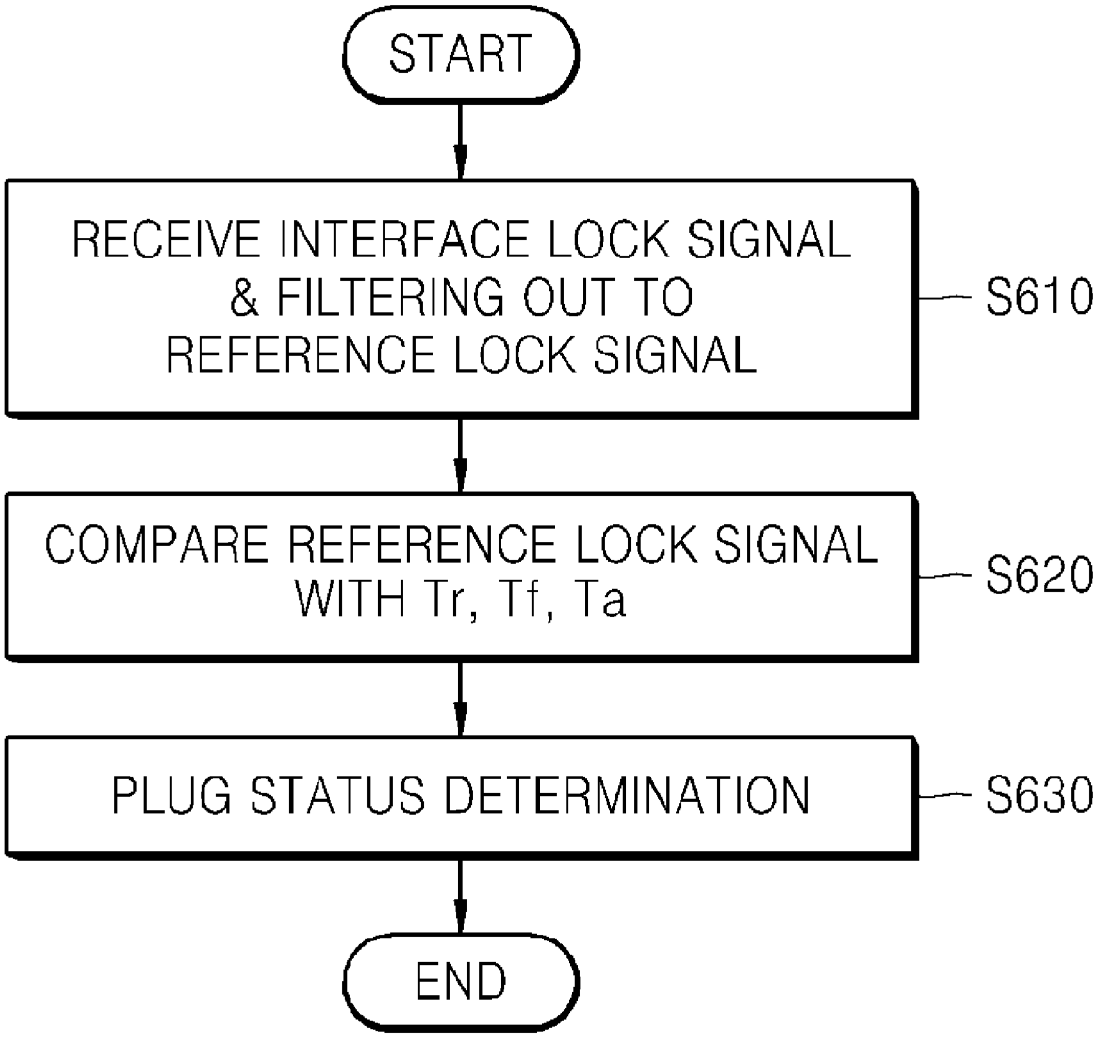
FIG. 6 is a flowchart summarizing a method of determining a cable plug status according to an embodiment of the inventive concept.

FIG. 6 is a flowchart summarizing a method of determining a cable plug status according to an embodiment of the inventive concept.

First, an apparatus that detects the cable plug status by using the timing controller of FIG. 4 and/or according to the timing diagram of FIG. 5 receives the interface lock signal from the graphics system (210 of FIG. 2) and outputs the interface lock signal as the reference lock signal after filtering the interface lock signal, as necessary (S610).

Then, the apparatus that detects the cable plug status compares the reference lock signal with the rising time Tr, the falling time Tf, and the transit time Ta to determine the cable plug status as a logic value (S620). Comparison inequalities as shown in Table 1 may be used to make this determination. Finally, the apparatus that detects the cable plug status determines and indicates the cable plug status according to the comparison.

Figure 7:
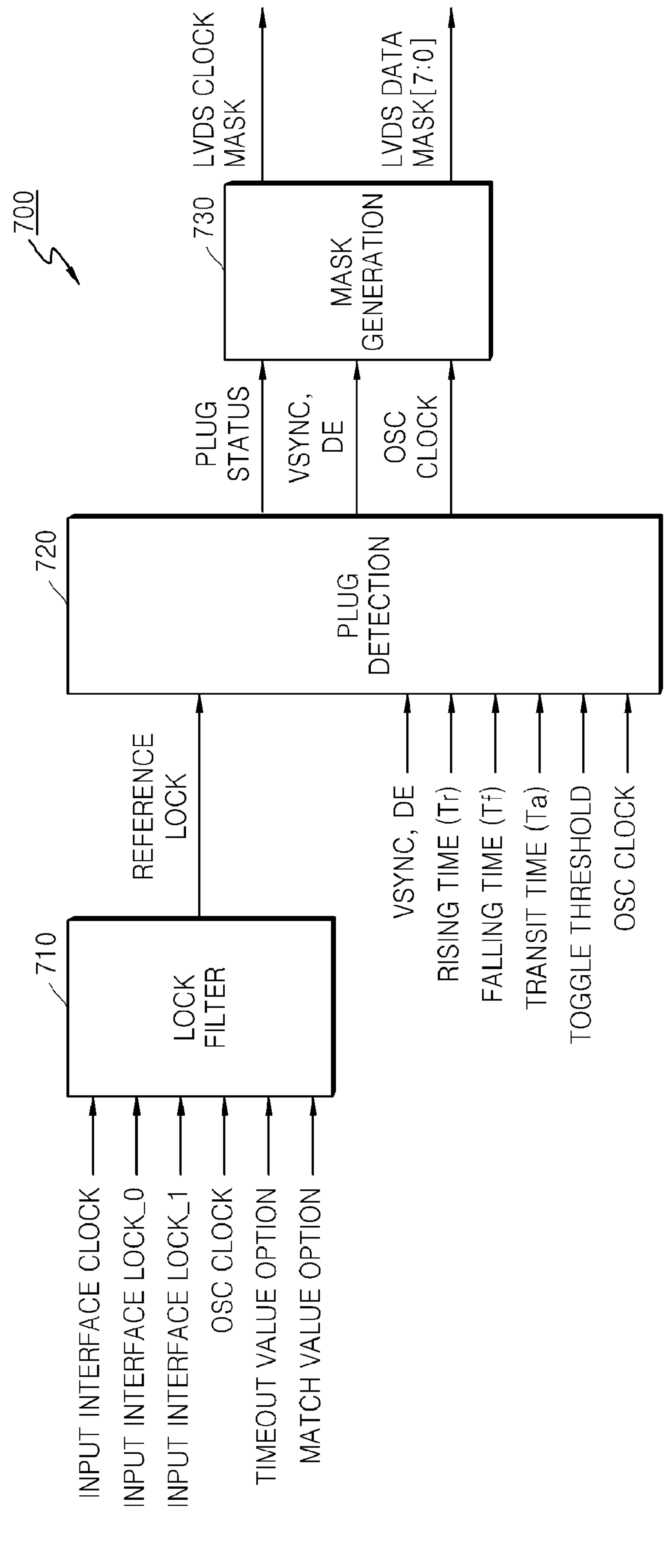
FIG. 7 is a block diagram illustrating a timing controller providing a plug status detection function according to an embodiment of the inventive concept.

FIG. 7 is a block diagram illustrating a timing controller 700 incorporating a cable plug status detection function according to an embodiment of the inventive concept.

Referring to FIG. 7, the timing controller 700 comprises a lock filter unit 710, a plug detection unit 720, and a mask generation unit 730.

The lock filter unit 710 filters an interface lock signal input from the graphics system (210 of FIG. 2) and outputs the filtered interface lock signal to the plug detection unit 720 as a reference lock. In the specifically illustrated embodiment of FIG. 7, the lock filter unit 710 receives an input interface clock signal, input interface lock signals (INPUT INTERFACE LOCK_0 and INPUT INTERFACE LOCK_1), an oscillator (OSC) clock, a timeout value option, and a match value option. The input interface lock signal that is first filtered by the lock filter unit 710 is output as a reference lock signal for detecting cable plug status by the lock filter unit 710.

Figure 8:
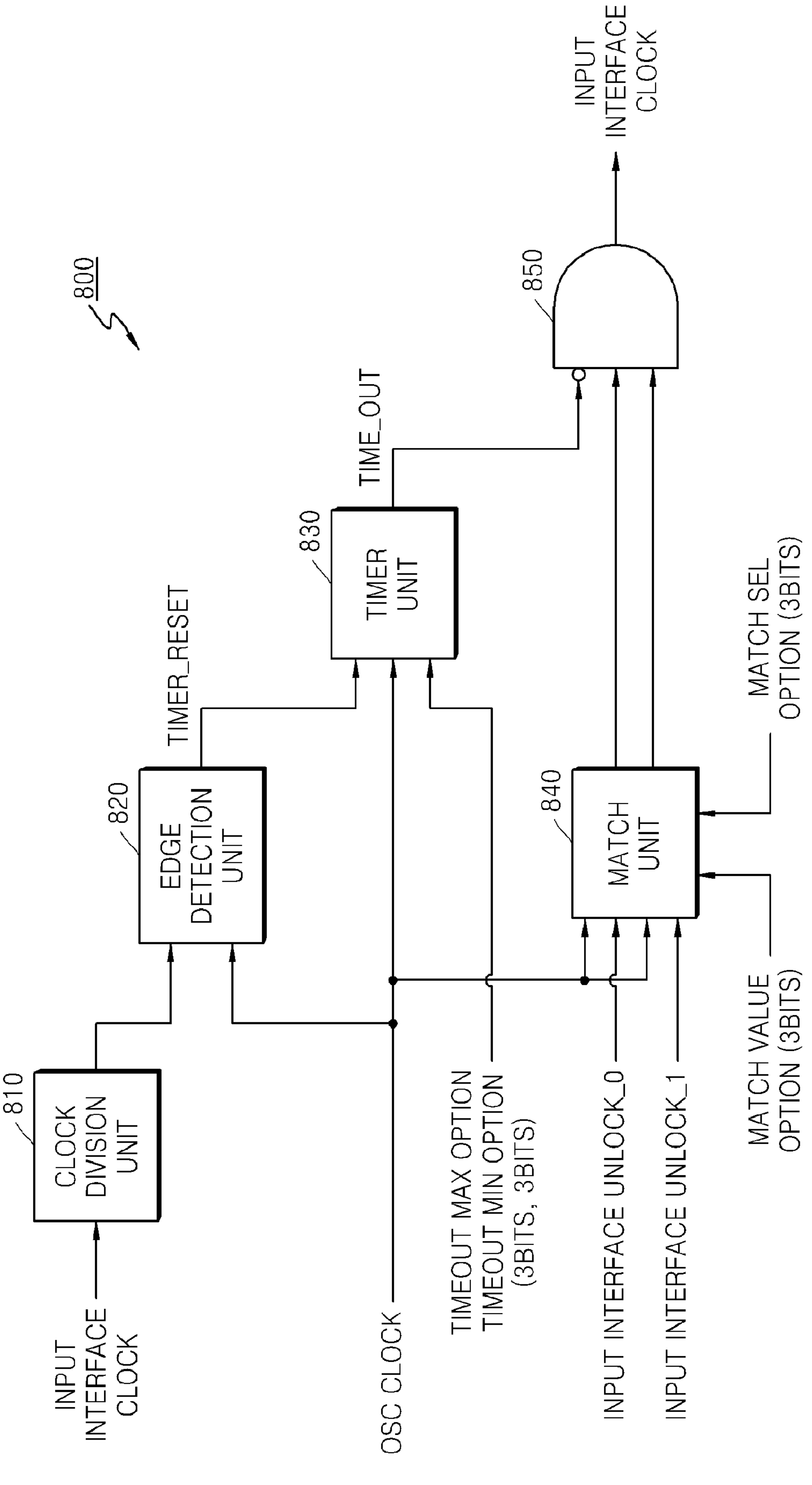
FIG. 8 is a circuit diagram illustrating a lock filter unit of the timing controller providing the plug status detection function of FIG. 7 according to an embodiment of the inventive concept.

The operation of the lock filter unit 710 will be further described in the context of one embodiment with reference to FIG. 8. However, more generally, the lock filter unit 710 generates the reference lock signal according to the input interface clock signal, the input interface lock signals, the oscillator clock signal, the timeout value option, and the match value option. The reference lock signal is used as a reference signal for detecting cable plug status using the plug detection unit 720.

The plug detection unit 720 compares the reference lock signal with the rising time Tr, the falling time Tf, and the transit time Ta, as described with reference to FIG. 5. When the reference lock signal is maintained high for the rising time Tr, it is determined that the cable plug status has changed from unplugged to plugged. Those skilled in the art will recognize that the assignment of high and low control signal levels to the various cable plug states is arbitrary and a matter of system design.

When the level of the reference lock signal changes from high to low and is maintained for the falling time Tf, the timing controller 230 recognizes that the cable plug status has been changed from plugged to unplugged.

Also, when the vertical synchronous signal Vsync is maintained high and the reference lock signal is changed from low to high and is maintained at a low for the transit time Ta input to the plug detection unit 720, the plug detection unit 720 may determine that the cable plug status between the graphics system 210 and the timing controller 230 has been changed from plugged to unplugged.

When the vertical synchronous signal Vsync is low, the reference lock signal should be maintained for the rising time Tr that is longer than the transit time Ta so as to determine a change of the cable plug status. The reason for this is because a LVDS clock frequency is changed in a section where the vertical synchronous signal Vsync is mainly low, and the reference lock signal needs to be changed more dramatically.

On the other hand, when the vertical synchronous signal Vsync is high, the change of the cable plug status should be determined based on a shorter duration of the transit time Ta. Thus, the reference lock signal may be compared with the transit time Ta, instead of the rising time Tr and the falling time Tf.

Conditions (or criterion) for determining the cable plug status may be the same as those listed in Table 1 and previously described in relation to the timing diagram of FIG. 5. In this regard, the reference lock signal is used as a signal filtered by the lock filter unit 710.

The mask generation unit 730 masks a clock signal LVDS Clock received through LVDS by receiving the plug status and the vertical synchronous signal Vsync, the data enable signal DE, and the oscillator clock signal OSC CLOCK, and masks data LVDS Data received through LVDS. One possible approach to the masking of the signals and data will be described with reference to FIG. 9.

As described above, even when hot plug pins are not allocated between the graphics systems 210 and the timing controller 230, hot plugging may be detected by an incorporated logic circuit according to various embodiments of the inventive concept. In this way, the display system (200 of FIG. 2) may determine effects of a glitch, such as a short pulse signal generated by noise in the system, as a logic value during cable plugging or when the plug status or the unplug status is not achieved, may mask the data and the clock signals, and may prevent values of registers in the timing controller 230 from being changed in a undesired way.

FIG. 8 is a circuit block diagram of a lock filter unit 800 that may be incorporated with the timing controller (230 of FIG. 2) to implement a cable plug status detection function, such as the one illustrated in FIG. 7, according to an embodiment of the inventive concept. The lock filter unit 800 determines whether the interface lock signal input from the graphics system (210 of FIG. 2) is a “lock” signal or whether the interface lock signal input from the graphics system (210 of FIG. 2) is an “unlock” signal, and a result determined by the lock filter unit 800 is transferred to the plug detection unit (420 of FIG. 4). Finally, the lock filter unit 800 is used to filter the interface lock signal.

The interface clock signal input to the lock filter unit 800 is divided by a clock signal division unit 810. The divided clock signal is input to an edge detection unit 820. The edge detection unit 820 detects an edge of the divided clock signal by receiving an oscillator clock signal and outputs a timer-reset signal to a timer unit 830.

A timeout maximum option and a timeout minimum option are input to the timer unit 830. The timeout maximum option and the timeout minimum option may include a 3-bit input, for example. In one particular example, the timeout maximum option and the timeout minimum option may have one of values 0 through 7 according to a 3-bit value. For example, when 3 bits of the timeout maximum option are set as 101 and 3 bits of the timeout minimum option are set as 010, the timeout maximum option is 5 and the timeout minimum option is 2 so that a timeout signal may be output according to the two values of the two options and an oscillator input.

When an input signal is not input to the timing controller 230 through LVDS, i.e., when a connection cable is detached from the display system 200, the oscillator clock signal is not input to the timing controller 230. In this case, in order to determine the interface lock signal as an unlock signal, when the oscillator clock signal is maintained high greater than the level of the timeout maximum option input to the timer unit 830, the timer unit 830 outputs a timeout signal and indicates that the lock signal is in an unlock status. Conversely, when the oscillator clock signal is maintained low below that of the level of the timeout minimum option, this case is also determined as the unlock status in which the cable is detached from the display system 200, and the timeout signal is output from the timer unit 830.

A match unit 840 is used to protect a device from temporary electrostatic discharge (ESD) noise. In detail, when the oscillator clock signal is severely toggled, the lock signal is determined as an unlock signal so that the oscillator clock signal may be used without undue or erroneous influence.

A match selection option is used to determine a clock signal that is at a predetermined time interval as a lock signal according to frequencies of clock signals. In the illustrated embodiment, 3 bits are allocated to the match selection option, and the match selection option may have values of 0 through 7.

A match value option is used to determine the lock signal according to the number of clock signals. The interface lock signal may be determined as the lock signal depending on how many times a predetermined number of clock signals are identical with the interface lock signal input to the lock filter unit 800. As indicated in FIG. 8, 3 bits are allocated to the match value option, and the match value option may have values of 0 through 7.

According to the above examples, the lock filter unit 800 receives (1) the timeout signal, (2) an output signal that allows the clock signal to be determined as an effective lock signal only when the clock signal is at a predetermined time interval by the match selection option, and a signal determined as the lock signal depending on how many times the lock signal is identical with a predetermined number of clock signals as a logical operation (AND) signal and determines all of the timeout signal, the output signal, and the signal determined as the lock signal as effective lock signals when they are determined as effective lock signals, and when one of them is in the unlock status, the lock filter unit 800 determines all of them as unlock signals and filters the interface lock signal. The lock signal filtered by the lock filter unit 800 is a reference lock signal that is finally input to the plug detection unit (see 720 of FIG. 7).

In this way, the lock filter unit 800 may filter the input interface lock signal, and the plug status of the cable may be determined using the input interface lock signal without using the lock filter unit 800, as illustrated in FIG. 4.

Figure 9:
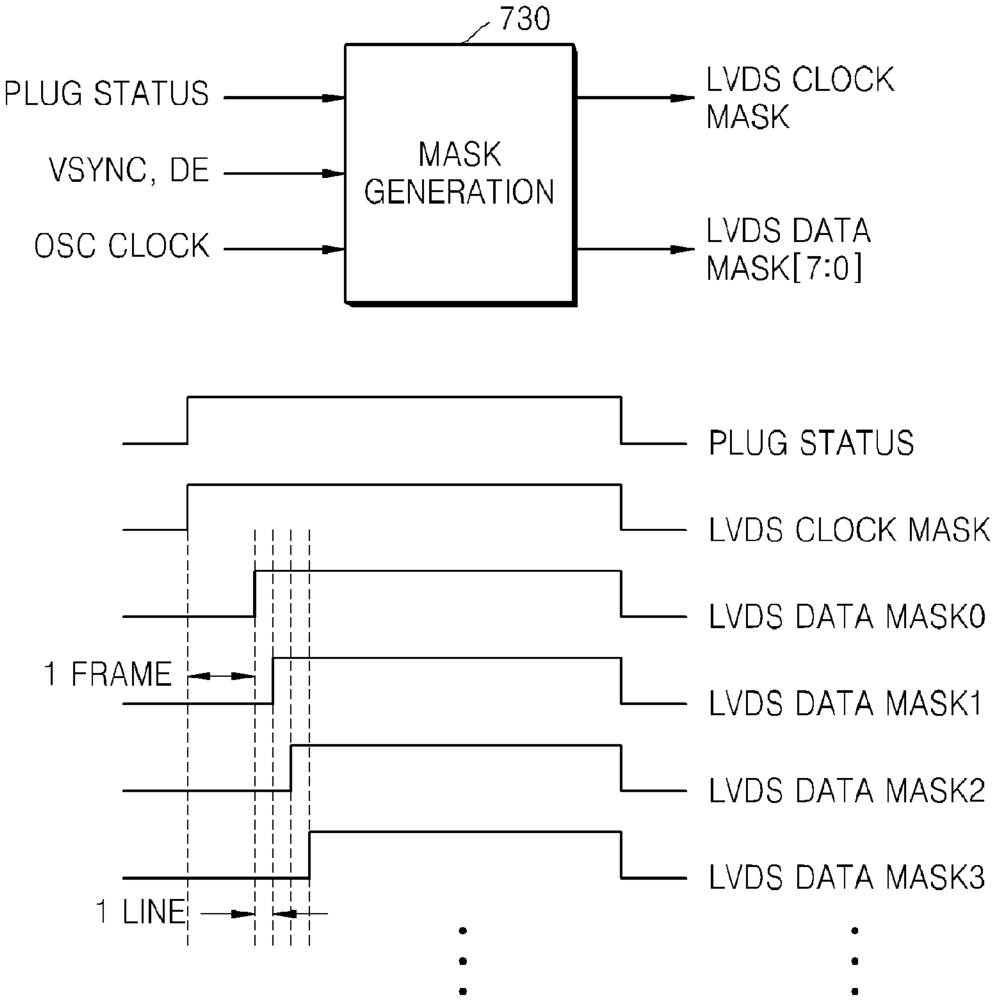
FIG. 9 is a block diagram and related timing diagram illustrating a mask generation unit and masking function according to an embodiment of the inventive concept.

FIG. 9 illustrates a block diagram of the mask generation unit 730 and a timing diagram of masking according to an embodiment of the inventive concept.

The mask generation unit 730 receives the plug status and the vertical synchronous signal (Vsync), the data enable signal (DE), and the oscillator clock signal (OSC CLOCK). A clock signal (LVDS CLOCK) input to LVDS is synchronized with the plug status and is masked according to a change of the plug status. When one frame elapses due to the vertical synchronous signal Vsync, a data bit is masked in each edge of the oscillator clock signal sequentially, i.e., in the order of LVDS DATA MASKS 0, 1, 2, 3, . . . .

Figure 10:
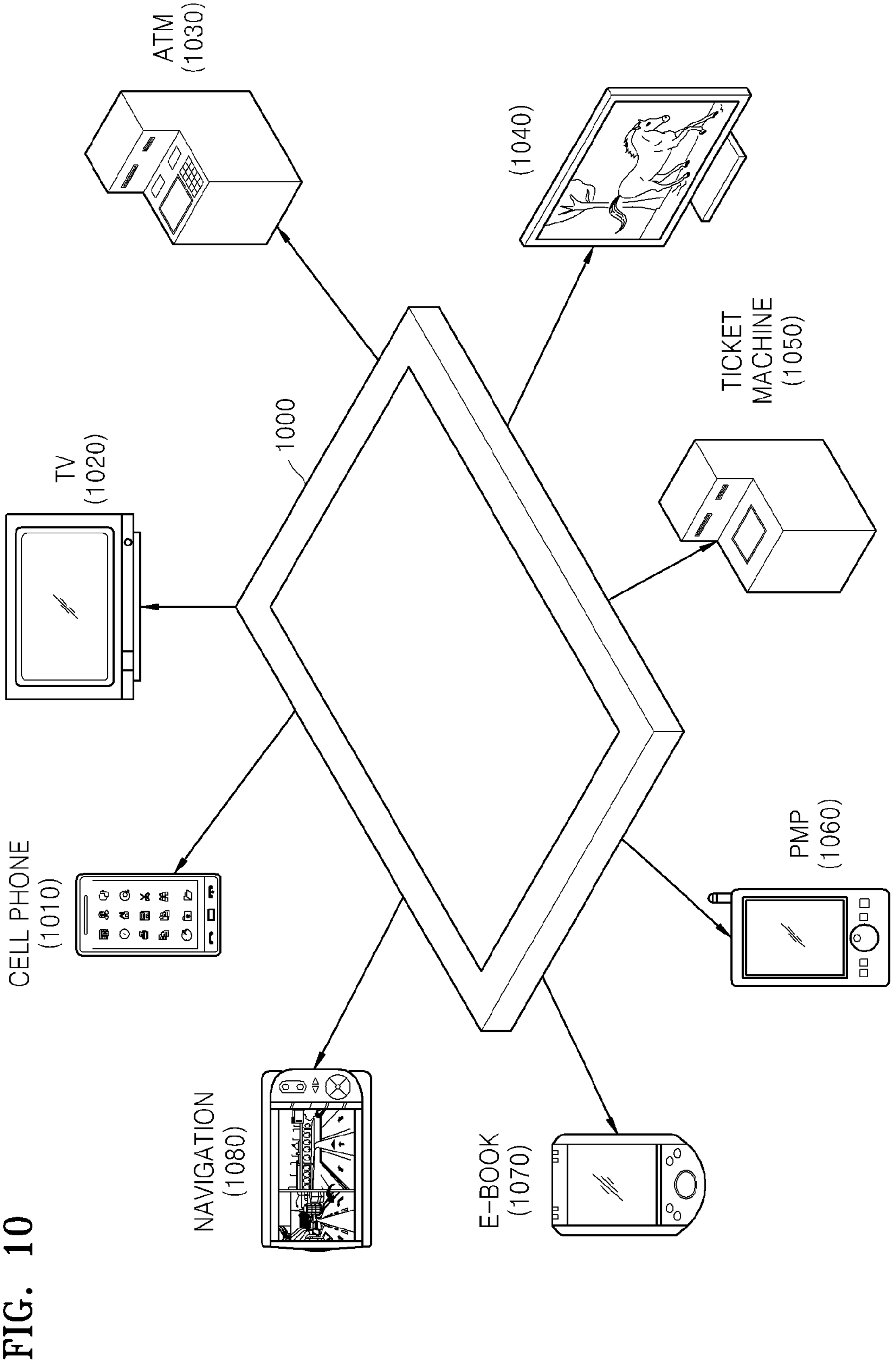
FIG. 10 illustrates various products that may incorporate a display system designed and/or operated according to an embodiment of the inventive concept.

FIG. 10 illustrates applications of various products which may incorporate a display system 1000 according to an embodiment of the inventive concept.

The display system 1000 having a plug detection function according to the current embodiment of the present invention may be employed in a cell phone 1010 and may be widely used in a television (TV) 1020, an automated teller machine (ATM) 1030 that automatically allows a user to remit or withdraw cash from a bank, a monitor 1040, a ticket machine 1050 that is used in subways, etc., a portable media player (PMP) 1060, an e-book 1070, a navigation device 1080, or the like. Those skilled in the art will recognize these are merely selected examples of possible applications benefiting from the incorporation the display system 1000.

The display system according to the inventive concept has a cable plug status detection function so that when an initial display and a graphics system of various display systems described above are connected to each other, errors, such as a change of values of registers in the display system and the occurrence of an abnormal screen may be prevented.

While the inventive concept has been particularly shown and described with reference to exemplary embodiments thereof, it will be understood that various changes in form and details may be made therein without departing from the scope of the following claims.

What is claimed is:

1. A method detecting a cable plug status in a display device including a graphics system and timing controller, the method comprising:

receiving a reference lock signal in the timing controller from a graphics system via a cable connecting the graphics system with the timing controller; and comparing the reference lock signal to at least one reference time period to determine the cable plug status, wherein the reference time periods include a rising time, such that upon determining that the reference lock signal remains at a first logic level for at least the rising time, a positive cable plug status is determined indicating that the cable is plugged in, and wherein the reference time periods include a falling time, such that upon determining that the reference lock signal remains at a second logic level for at least the falling time, a negative cable plug status is determined indicating that the cable is unplugged.

2. The method of claim 1, further comprising:

receiving in the timing controller a vertical synchronous (sync) signal used in the display device, wherein the reference time periods include a transit time, such that upon determining that the vertical sync signal is high and a transition in the reference lock signal from the first logic level to the second level is less than the transit time, the positive cable plug status is determined.

3. The method of claim 1, further comprising:

receiving in the timing controller a vertical synchronous (sync) signal used in the display device, wherein the reference time periods include a transit time, such that upon determining that the vertical sync signal is high and a transition in the reference lock signal from the first logic level to the second level is greater than the transit time, the negative cable plug status is determined.

4. The method of claim 1, further comprising:

receiving in the timing controller a vertical synchronous (sync) signal used in the display device, wherein the reference time periods include a transit time, such that upon determining that the vertical sync signal is low and a transition in the reference lock signal from the first logic level to the second level is less than the falling time, the positive cable plug status is determined.

5. The method of claim 1, further comprising:

receiving in the timing controller a vertical synchronous (sync) signal used in the display device, wherein the reference time periods include a transit time, such that upon determining that the vertical sync signal is low and a transition in the reference lock signal from the first logic level to the second level is greater than the falling time, the negative cable plug status is determined.

6. The method of claim 1, wherein the reference lock signal is a cyclical signal and the method further comprises:

counting a number of counted cycles for the reference lock signal;

comparing the number of counted cycles to a reference cycle threshold;

upon determining that the number of counted cycles is less than the reference cycle threshold, determining the positive cable plug status indicating that the cable is plugged in, and upon determining that the number of counted cycles is greater than the reference cycle threshold, determining the negative cable plug status indicating that the cable is unplugged.

7. A method detecting a cable plug status in a display device including a graphics system and timing controller, the method comprising:

receiving a reference lock signal in the timing controller from a graphics system via a cable connecting the graphics system with the timing controller;

comparing the reference lock signal to at least one reference time period to determine the cable plug status; and upon determining a positive cable plug status indicating that the cable is plugged in, masking a clock signal applied via the cable from the graphics system to the timing controller and sequentially masking at least one data bit applied via the cable from the graphics system to the timing controller.

8. The method of claim 1, further comprising:

filtering an input reference clock received in the timing controller from the graphics system to generate the reference lock signal.

9. The method of claim 7, wherein the filtering of the input reference clock comprises comparing a level of the input reference clock to a level defined by a timeout setting value.

10. The method of claim 7, wherein the filtering of the input reference clock comprises comparing the input reference clock to a reference time interval.

11. The method of claim 7, wherein the filtering of the input reference clock comprises comparing the input reference clock to a reference number of clock signals.

12. A timing controller providing a cable plug status detection function, the timing controller comprising:

a plug detection unit that receives a reference lock signal from a graphics system connected via a cable and compares the reference lock signal to at least one reference time period to determine the cable plug status, wherein the reference time periods include a rising time, such that upon determining in the timing controller that the reference lock signal remains at a first logic level for at least the rising time, a positive cable plug status is determined indicating that the cable is plugged in, and wherein the reference time periods include a falling time, such that upon determining in the timing controller that the reference lock signal remains at a second logic level for at least the falling time, a negative cable plug status is determined indicating that the cable is unplugged.

13. The timing controller of claim 12, wherein the timing controller further receives a vertical synchronous (sync) signal used in a display panel connected to the timing controller, and the reference time periods include a transit time, such that upon determining in the timing controller that the vertical sync signal is high and a transition in the reference lock signal from the first logic level to the second level is less than the transit time, the positive cable plug status is determined.

14. The timing controller of claim 12, wherein the timing controller further receives a vertical synchronous (sync) signal used in a display panel connected to the timing controller, and the reference time periods include a transit time, such that upon determining in the timing controller that the vertical sync signal is high and a transition in the reference lock signal from the first logic level to the second level is greater than the transit time, the negative cable plug status is determined.

15. The timing controller of claim 12, wherein the timing controller further receives a vertical synchronous (sync) signal used in a display panel connected to the timing controller, the reference time periods include a transit time, such that upon determining in the timing controller that the vertical sync signal is low and a transition in the reference lock signal from the first logic level to the second level is less than the falling time, the positive cable plug status is determined, else upon determining that the vertical sync signal is low and a transition in the reference lock signal from the first logic level to the second level is greater than the falling time, the negative cable plug status is determined.

16. The timing controller of claim 12, wherein the reference lock signal is a cyclical signal and timing controller comprises:

a counter that counts a number of counted cycles for the reference lock signal;

a comparator that compares the number of counted cycles to a reference cycle threshold, such that upon determining that the number of counted cycles is less than the reference cycle threshold the positive cable plug status is determined indicating that the cable is plugged in, and upon determining that the number of counted cycles is greater than the reference cycle threshold the negative cable plug status is determined indicating that the cable is unplugged.

* * * * *